United States Patent [19]

Schulze et al.

[11] 4,264,650

[45] Apr. 28, 1981

[54] METHOD FOR APPLYING STRESS-CRACK RESISTANT FLUOROPOLYMER COATING

[75] Inventors: Stephen R. Schulze, Gillette; Elmer C. Lupton, Mountain Lakes; William A. Miller, Somerville; Robert H. Hutzler, Chatham, all of N.J.

[73] Assignee: Allied Chemical Corporation, Morris Township, Morris County, N.J.

[21] Appl. No.: 8,657

[22] Filed: Feb. 1, 1979

[51] Int. Cl.³ .............................................. B05D 3/02
[52] U.S. Cl. .............................. 427/195; 260/29.6 F; 427/29; 427/318; 427/374.1; 427/374.4; 427/385.5; 427/388.1; 427/388.2; 427/388.4
[58] Field of Search .............................. 428/421, 422; 427/385 R, 27, 185, 195, 318, 374 C, 388 A, 388 C, 374 R, 29, 374.1, 374.4, 385.5, 388.1, 388.2, 388.4; 204/159.17; 260/884, 29.6 F

[56] References Cited

U.S. PATENT DOCUMENTS

| | | |
|---|---|---|
| 2,392,378 | 1/1946 | Hanford . |
| 3,371,076 | 2/1968 | Ragazzini et al. . |
| 3,501,446 | 3/1970 | Ragazzini et al. . |
| 3,528,954 | 9/1970 | Carlson . |
| 3,840,619 | 10/1974 | Aronoff et al. ............. 204/159.17 X |
| 3,847,881 | 10/1974 | Mueller et al. . |
| 3,900,684 | 8/1975 | Edwards et al. ............ 260/29.6 F X |
| 3,936,569 | 2/1976 | Miller et al. ..................... 427/318 X |
| 3,947,525 | 3/1976 | Robertson et al. ............. 204/159.17 |
| 3,995,091 | 11/1976 | Dhami ............................ 428/422 X |
| 4,070,341 | 1/1978 | Schulze ........................ 260/45.75 V |
| 4,104,416 | 8/1978 | Parthasarathy et al. ........ 427/195 X |
| 4,107,356 | 8/1978 | Ukihashi et al. .................... 427/195 |

FOREIGN PATENT DOCUMENTS 949422 2/1964 United Kingdom .

OTHER PUBLICATIONS

*Nucleonics*, Sep. 1964, pp. 72–74, "Radiation–Initiated Polymerization–PT III".

*Primary Examiner*—Ronald H. Smith
*Assistant Examiner*—Thurman K. Page
*Attorney, Agent, or Firm*—Richard A. Negin; Alan M. Doernberg

[57] ABSTRACT

Disclosed is a method for coating substrates with a stress-crack resistant coating of a fluoropolymer and a polyfunctional compound having two or more allyl groups such as triallylcyanurate or triallylisocyanurate wherein the fluoropolymer is a polymer comprised of ethylene, chlorotrifluoroethylene or tetrafluoroethylene and optionally a termonomer such as 3,3,3-trifluoro-2-trifluoromethyl propene. The ingredients are homogeneously blended and applied to the substrate which is maintained at an elevated temperature to allow flow-out of the coating mixture thereby forming a stress-crack resistant coating.

26 Claims, No Drawings

METHOD FOR APPLYING STRESS-CRACK RESISTANT FLUOROPOLYMER COATING

BACKGROUND OF THE INVENTION

1. Field of the Invention

This invention relates to a method for coating substrates with a copolymer of ethylene with chlorotrifluoroethylene, tetrafluoroethylene or mixtures thereof.

2. Discussion of the Prior Art

Coating compositions of copolymers of ethylene with chlorotrifluoroethylene or tetrafluoroethylene are well known in the art. These copolymers have outstanding mechanical, electrical and chemical properties at high temperatures. For example, about equimolar ethylene-chlorotrifluoroethylene copolymers are resistant to attack by most organic solvents at ambient, as well as elevated temperatures. They are also insoluble in acids and bases, including fuming nitric acid, possess high tensile strength and have melting points above about 200° C. Such copolymers are suitable for making such useful articles as valves, gaskets, pipes, wire insulation, sheets, films, etc.

These copolymers have met with limited commercial success owing to certain disadvantageous properties. For example, while these copolymers were known to have melting points as high as about 300° C., they could not be used at high temperatures, even far below their melting points, in applications requiring strength owing to deterioration of the mechanical properties of the copolymer. For, example, when used as wire coating, the copolymer became brittle at about 200° C., and cracked under relatively low stress leaving the wire exposed.

Attempts have been made to overcome such disadvantages. For example, U.S. Pat. No. 3,947,525 to Robertson et al. discloses a melt-processable, radiation cross-linkable ethylene/chlorotrifluoroethylene type coating composition which, when coated on a substrate in the presence of radiation provides a high tensile strength stress-crack resistant coating.

SUMMARY OF THE INVENTION

In accordance with the present invention, a method is provided for coating a substrate with a stress-crack resistant fluoropolymer coating without the need for radiation. The method comprises homogeneously mixing a fluoropolymer resin with about 0.05 to 15 weight percent, based on the total weight of ingredients, of a polyfunctional compound containing two or more allyl groups, wherein the fluoropolymer is selected from the group consisting of (a) a copolymer containing units derived from ethylene and a monomer selected from the group consisting of chlorotrifluoroethylene and tetrafluoroethylene, or mixtures thereof, and (b) a polymer comprised of from about 40 to 60 mol percent ethylene, about 60 to 40 mol percent chlorotrifluoroethylene or tetrafluoroethylene and about 0.1 to 10 mol percent of a fluorinated termonomer selected from the group consisting of 3,3,3-trifluoro-2-trifluoromethyl propene, hexafluoroacetone, a vinyl monomer which is free of telogenic activity and which provides a side chain having at least two carbon atoms, the side chain being aromatic or having its elements bonded by a single bond only, and mixtures thereof. The mixture is coated onto the surface of a substrate and the temperature of the coated substrate is maintained above the melting point of the coating for a time sufficient to flow-out the coating to form a smooth coated surface. The coated substrate is then cooled to room temperature. Preferably heat stabilizers are incorporated into the coating mixture.

In one preferred embodiment of the present invention the fluoropolymer is comprised of 40 to 60 mol percent ethylene, 60 to 40 mol percent chlorotrifluoroethylene and 0.5 to 5 mol percent of 3,3,3-trifluoro-2-trifluoromethyl propene; the polyfunctional monomer is triallylcyanurate or triallylisocyanurate; and the heat stabilizer is an acid neutralized di-or trivalent metal oxide. Also, in this preferred embodiment, the substrate is preheated to about 250° to 370° C., the coating mixture applied electrostatically in powder form, and the substrate thereafter heated to a temperature of about 255° to 300° C. for about 10 to 40 minutes to cause flow-out of the coating.

DETAILED DESCRIPTION

Polymers of ethylene and chlorotrifluoroethylene or tetrafluoroethylene suitable for use in the present invention are high molecular weight, normally solid thermoplastic polymers. Preferably these polymers contain about 40 to 60 mol percent ethylene and correspondingly about 60 to 40 mol percent chlorotrifluoroethylene or tetrafluoroethylene and have a melting point higher than about 200° C. More preferably, there is employed in this invention about equimolar copolymers containing about 45 to 55 mol percent ethylene and correspondingly about 55 to 45 mol percent chlorotrifluoroethylene or tetrafluoroethylene and having a melting point above 220° C., most preferably above 235° C. The preferred copolymers have a melt index of about 5.0 to 20.0 as determined according to ASTM D-1238-62T. Optionally these polymers may contain about 0.1 to 10 mol percent of a termonomer selected from the group consisting of 3,3,3-trifluoro-2-trifluoromethyl propene, hexafluoroacetone, a vinyl monomer which is free of telogenic activity and which provides a side chain having at least two carbon atoms, the side chains being aromatic or having its elements bonded by a single bond only, and mixtures thereof. It is preferred that 0.5 to 5 mol percent such termonomers be used and more preferred is when the termonomer is 3,3,3-trifluoro-2-trifluoromethyl propene. These compositions are more specifically described in U.S. Pat. No. 4,070,341 incorporated herein by reference.

The ethylene-chlorotrifluoroethylene polymers can be prepared by various conventional processes which are not intended to limit the present invention. Illustrative of such processes include those set forth in U.S. Pat. No. 2,392,378 which teaches copolymerization of ethylene and chlorotrifluoroethylene in a stirred aqueous medium at superatmospheric pressure using benzoyl peroxide as a catalyst. Another process suitable for preparing the ethylene-chlorotrifluoroethylene copolymers of the present invention is taught in *Nucleonics*, September, 1964, pp. 72–74, which discloses formation of a high melting (237° C.) 1.1 alternating copolymer of ethylene and chlorotrifluoroethylene prepared by use of a radiation catalyst at 0° C. Also suitable is the process disclosed in British Pat. No. 949,422 which teaches the bulk copolymerization of ethylene with chlorotrifluoroethylene at temperatures between −80° to +50° C. using oxygen-activated alkyl carbon catalysts. Also suitable for preparing these copolymers is the method disclosed in U.S. Pat. Nos. 3,371,076 and 3,501,446 which teach the use of oxygen-activated boron-containing catalysts. About equimolar ethylene-chlorotrifluoroethylene copolymers having high melting points (above 200° C.) can also be prepared by batch bulk copolymerization at temperatures of about $-20°$ to $+20°$ C., at superatmospheric pressure in an agitator-equipped pressure vessel by bubbling gaseous ethylene through liquid chlorotrifluoroethylene which has been charged into said vessel. An organic peroxide type initiator, such as trichloroacetyl peroxide is also incorporated into the copolymerization system. If desired, small amounts of chain transfer agents, such as chloroform or heptane, can also be incorporated. The desired copolymer product is obtained as a dispersion in the monomer.

The tetrafluoroethylene-containing copolymers can be prepared by any of the non-limiting conventional methods. For example, they can be prepared by the non-aqueous polymerization set forth in U.S. Pat. No. 3,528,954 which comprises bringing the monomers together in a hydrochlorofluorocarbon solvent at a temperature from about 30° to 85° C. and in the presence of a polymerization initiator active at such temperature, and thereafter recovering the copolymer.

Cross-linking agents suitable for use in the present invention are those polyfunctional monomers containing two or more, preferably three or more allyl groups. The term "allyl groups" means those groups represented by the radical $CH_2=CH-CH_2$. Non-limiting examples of such cross-linking agents suitable for use herein are the polyallylesters of carboxylic acids and other acid moieties, such as cyanuric acid. Non-limiting examples of such compounds include diallyloxalate, diallylsebacate, diallylorthophthalate, diallylisophthalate, diallylfumarate, diallylterephthalate, triallylcyanurate, diallylaconitate, tetraallylpyromellitate, and triallylisocyanurate. Preferred are triallylcyanurate, triallylisocyanurate, tetraallylpyromellitate and diallylfumarate. The polyfunctional monomers may have the same functionality or a mixture of functional groups on the same molecule. Additionally, mixtures of various polyfunctional monomers may be used in the polymer.

The amount of polyfunctional monomer used will depend upon the degree of crosslinking required and the effectiveness of the particular monomer chosen. Particular combinations of process conditions and monomer concentrations can be adjusted by routine experimentation to achieve a sufficiently stress-crack resistant coating. In general, the polyfunctional monomer should be present in an amount of at least 0.05 weight percent. Although the upper limit of polyfunctional monomer can be relatively high, for example 15 weight percent, 10 weight percent will generally be sufficient to obtain the desired properties. Preferably the range of polyfunctional monomer used herein is from about 0.25 to 4.0 weight percent, all weight percents are based on the total weight of all the ingredients.

Heat stabilizers suitable for use herein if employed can be any of those generally used in the thermoplastic art. Nonlimiting examples of such heat stabilizers are those described in U.S. Pat. No. 3,947,525 to Robertson et al. and U.S. Pat. No. 4,070,341 to Schulze both of which are incorporated herein by reference. These heat stabilizers include a mixture of a phosphite or an organic polyhydric phenol and a salt of a carboxylic acid and a metal of Group II of the Periodic Table of the Elements. Also included are alkylated phenol or bisphenol having 1 to 18 carbon atoms in the alkyl chain such as butylated hydroxytoluene; 4,6-di-tert-butylmetacresol and the like, and an alkylidene bis, tris or other polyphenol having 1 to 18 carbon atoms in the alkylidene chain such as tetrakis-[methylene-3-(3',5'-di-tert-butyl-4'-hydroxyphenyl)propionate]methane; 2,2-methylene-bis-(4-ethyl-6-tert-butyphenol) and the like. Preferably, the heat stabilizer is admixed with an ester or alkali metal salt of thiodipropionic acid. Also included are the epoxy resins which can be saturated or unsaturated, aliphatic, cycloaliphatic, heterocyclic, aromatic and may be substituted with bromine, chlorine, hydroxyl, ether radicals and the like. Any of the well known epoxy resins may be employed such as the epoxy novolacs, including epoxidized o-cresol novolacs such as the polyglycidyl ether of o-cresol formaldehyde novolac, the di- and polyglycidyl ethers of bisphenol A and brominated versions thereof.

Also suitable for use as the heat stabilizers herein, and most preferred, are those acid neutralizing metal oxides and their complexes wherein the standard free energy change in going from the oxide to the corresponding metal chloride is equal to or less than about 11 kcal/mol for divalent metals, and equal to or less about 16 kcal/mol for trivalent metals. Metal oxide complexes meeting the energy requirements as set forth above, which would otherwise substantially inhibit the acid neutralizing ability of the metal oxide, are not suitable for use herein. Also, metal oxides wherein the metal is a metal from Group I of the Periodic Table of the elements are not suitable for use herein. Non-limiting examples of such stabilizers suitable for use herein include lead oxide, calcium oxide, magnesium oxide, barium oxide, manganese oxide, cadmium oxide, strontium oxide, tin oxide and tribasic lead sulfate. Preferred is tribasic lead sulfate. In a preferred embodiment of the present invention about 0.1 to 10 wt. % of a heat stabilizer as disclosed herein is used.

The polymers of the present invention may be applied as protective coatings on any substrate which is able to withstand temperatures greater than about 255° C. Non-limiting examples of preferred substrates include ferrous metals such as iron and steel, ferrous alloys such as stainless steel, non-ferrous metals such as aluminum, zinc, copper and the like and alloys thereof.

In accordance with the present invention the coating compositions herein may be homogeneously blended by any conventional means either in dry solid powder form or by first dissolving the crosslinking agent in a common organic solvent such as trichlorofluoromethane, trichloroethylene or hydrocarbons such as xylene, tetrahydrofuran or mixtures thereof. The solution is then mixed with the polymer of ethylene and chlorotrifluoroethylene or tetrafluoroethylene or mixtures thereof and ball milled for about 15 to 60 minutes. The ball milled mixture is then dried by heating in an oven at a temperature near the boiling point of the solvent until the solvent is evaporated. The heat stabilizer if employed, is then added and powder-mixed for about 0.5 to 30 minutes.

This mixture is then coated, preferably by electrostatically spraying, onto a substrate which preferably has been preheated to an elevated temperature, above the melting point of the coating mixture, preferably about 250° to 360° C., more preferably about 285° to 340° C. The coated substrate is then placed in an oven at a temperature and time sufficient to allow flow-out of the coating mixture. Generally the temperature suitable for flow-out is about 255° to 300° C., preferably 260° to 298° C. for a period of time from about 5 to 60 minutes, preferably about 10 to 40 minutes. The coated substrate is then cooled to room temperature (20° C.). It is also within the scope of the present invention that the coating material be applied by other conventional techniques such as plasma or dispersion applications. Generally, plasma application is accomplished by subjecting the coating material, while being sprayed, to a plasma field before said coating material strikes the substrate. The dispersion technique can be accomplished by emulsifying the resin in water, then applying said resin to a substrate by painting or spraying and thereafter evaporating the residual water from the coated surface before raising the temperature of the substrate to flow-out temperature.

The coating thickness on the substrate can be varied and is adjusted by controlling the amount of coating material sprayed on the substrate. Coatings of about 10 to 50 mils thickness have been found to be particularly suitable. Preferred are coatings having a thickness of about 15 to 30 mils.

Stress-crack resistance of the coating can be measured by repeatedly placing the coated substrate in an oven at successively higher temperatures for about 18 hours each, until cracks are developed in the coating. The initial test temperature is 130° C., and the temperature is raised 10° C. for each successful trial. The temperature at which the first crack appears is the crack temperature.

Melt flow rate, also known as melt index, is determined according to ASTM Method D-1238-62T, and is measured for the purposes of this invention by forcing the melted polymer at a specified temperature through an orifice having a diameter of 0.21 cm and length of 0.810 cm with a weight of 2160 g. Melt flow rate can be defined as the weight of molten polymer that passes through the orifice in 10 minutes at the given temperature and at the given extrusion weight.

The following examples are illustrative of the present invention and of the best mode contemplated for practicing the invention. The present invention is not to be interpreted as limited to all details of the examples.

EXAMPLES 1-14

Various amounts of triallylisocyanurate, as implied in Table I, were dissolved in 100 cc of trichlorofluoromethane. This solution was mixed with one pound of powdered ethylene-chlorotrifluoroethylene copolymer and ball milled for one hour. The mixture was dried at a temperature of 70° C. for 20 hours after which 4.5 g (1.0 wt.%) of tribasic lead sulfate powder was added by powder mixing for 1 minute. The resulting mixture was then electrostatically sprayed onto a steel bolt placed with its head downward and which had been preheated to a temperature of about 340° C. The thickness of the coating was about an eighth of an inch at the head landing. By head landing we mean that area of the bolt represented by the junction of the head and the shaft. The coated bolt, whose diameter was ¾ inch with a round 1¼ inch diameter head, was placed in an oven at various temperatures and times to flow-out the coating material into a smooth coating. The coated bolt was then cooled to room temperature.

Crack temperatures were measured by placing the coated bolt back into an oven at an initial temperature of 130° C. for about 18 hours. The temperature was raised 10° C. at a time wherein the time interval in the oven was 18 hours for each 10° C. rise in temperature. Table I contains the temperature at which the first crack appeared in the region of the bolt head which was recorded as the "crack temperature", as well as other pertinent data.

TABLE I

| | Coating Prepared with Triallylisocyanurate (TAIC) | | | |
|---|---|---|---|---|
| Ex. | TAIC Amount Wt. % | Flow-Out Temperature °C. | Flow-Out Time Min. | Crack Temperature °C. |
| 1 | 0.25 | 260 | 30 | 150 |
| 2 | 0.25 | 277 | 20 | 160 |
| 3 | 0.25 | 288 | 10 | 150 |
| 4 | 0.25 | 288 | 30 | 160 |
| 5 | 0.50 | 260 | 10 | 140 |
| 6 | 0.50 | 260 | 20 | 150 |
| 7 | 0.50 | 277 | 10 | 150 |
| 8 | 0.50 | 277 | 30 | 170 |
| 9 | 0.50 | 288 | 20 | 180 |
| 10 | 1.0 | 260 | 10 | 150 |
| 11 | 1.0 | 260 | 30 | 180 |
| 12 | 1.0 | 277 | 20 | 170 |
| 13 | 1.0 | 288 | 10 | 155 |
| 14 | 1.0 | 288 | 30 | 180 |

Without the use of the cross-linking agents as described herein, it was found that the ethylene-chlorotrifluoroethylene will generally crack at room temperature after the coated substrate is removed from the flow-out oven. Table I illustrates that when the claimed cross-linking agents of the present invention are incorporated into the instant coatings, significantly higher crack temperatures are obtained. Longer flowout time, higher flow-out temperature and greater amounts of cross-linking agent are all contributing factors for obtaining the highest crack temperature.

Although long flow-out times and high temperatures give the highest crack temperatures, they cause the resin to degrade and turn brown if too extreme.

EXAMPLES 15-24

The procedure set forth in Examples 1-14 was followed except that triallylcyanurate was used in place of triallylisocyanurate. The results are set forth in Table II below.

TABLE II

| | Coatings Prepared with Triallylcyanurate (TAC) | | | |
|---|---|---|---|---|
| Ex. | TAC Amount Wt. % | Flow-Out Temperature °C. | Flow-Out Time Min. | Crack Temperature °C. |
| 15 | 0.5 | 260 | 10 | 160 |
| 16 | 0.5 | 260 | 30 | 160 |
| 17 | 0.5 | 277 | 10 | 160 |
| 18 | 0.5 | 277 | 20 | 180 |
| 19 | 0.5 | 288 | 20 | 180 |
| 20 | 1.0 | 260 | 10 | 160 |
| 21 | 1.0 | 260 | 30 | 180 |
| 22 | 1.0 | 277 | 20 | 170 |
| 23 | 1.0 | 288 | 10 | 160 |
| 24 | 1.0 | 288 | 30 | 180 |

The data of Table II illustrate similar results for the use of triallylcyanurate as those shown in Table I for triallylisocyanurate.

EXAMPLES 25-29

The procedure of examples 15-24 was followed except that 1.0 wt. % diglycidyl ether of bisphenol A, hereinafter referred to as DER, was used as a heat stabilizer in place of 1.0 wt. % tribasic lead sulfate. The results are shown in Table III below.

TABLE III

Coatings prepared with Triallylcyanurate (TAC) and 1.0 wt. % DER

| Ex. | TAC Amount Wt. % | Flow-Out Temperature °C. | Flow-Out Time Min. | Crack Temperature °C. |
|---|---|---|---|---|
| 25 | 1.0 | 260 | 30 | 140 |
| 26 | 1.0 | 277 | 20 | 150 |
| 27 | 1.0 | 288 | 30 | 150 |
| 28 | 1.0 | 277 | 30 | 150 |
| 29 | 1.0 | 288 | 20 | 140 |

Table III illustrates that not all conventional heat stabilizers will give optimum crack temperatures. For example, when DER is used in place of tribasic lead sulfate, the coating's resistance to cracking is reduced although a commercially acceptable coating is still produced.

EXAMPLES 30–37

Coating compositions are prepared according to examples 1–14 except various polyfunctional monomers and heat stabilizers as set forth in Table IV are used.

TABLE IV

| Ex. | Polyfunctional Monomer 1.0 wt % | Heat Stabilizer 1.0 wt. % | Flow-Out Temperature °C. | Flow-Out Time Min. |
|---|---|---|---|---|
| 30 | diallyl oxalate | lead oxide | 270 | 20 |
| 31 | diallyl fumarate | calcium oxide | 270 | 20 |
| 32 | diallyl orthophthalate | magnesium oxide | 270 | 20 |
| 33 | diallyl isophthalate | barium oxide | 270 | 20 |
| 34 | diallyl terephthalate | manganese oxide | 270 | 20 |
| 35 | diallyl aconitate | cadmium oxide | 270 | 20 |
| 36 | tetraallyl pyromellitate | strontium oxide | 270 | 20 |
| 37 | triallyl cyanurate | tin oxide | 270 | 20 |

The stress-crack resistance of the coating compositions of these examples will be satisfactory as compared to coating compositions containing no cross-linking agent.

It is to be understood that variations and modifications of the present invention may be made without departing from the scope and spirit of the invention.

EXAMPLES 38–45

Coating compositions are prepared according to examples 30–37 except that a fluoropolymer containing 47.5 mol percent ethylene, 47.5 mol percent chlorofluoroethylene and 5 mol percent 3,3,3-trifluoro-2-trifluoromethyl propene is used. The stress-crack resistance of the coating compositions of these examples will be satisfactory as compared to similar compositions not containing 3,3,3-trifluoro-2-methyl propene.

What is claimed is:

1. A method for coating substrates with a stress-crack resistant fluoropolymer coating without irradiation, said method comprising:
   (a) preparing a homogeneous coating mixture comprised of a fluoropolymer and about 0.05 to 15 weight percent, based on the total weight of ingredients, of a polyfunctional monomer containing two or more allyl groups, wherein the fluoropolymer is selected from the group consisting of:
      (aa) a copolymer containing units derived from ethylene and a monomer selected from the group consisting of chlorotrifluoroethylene and tetrafluoroethylene or mixtures thereof, and (ab) a polymer comprised of from about 40 to 60 mol percent ethylene, about 60 to 40 mol percent chlorotrifluoroethylene and about 0.1 to 10 mol percent of a fluorinated termonomer selected from the group consisting of 3,3,3-trifluoro-2-trifluoromethyl propene, hexafluoroacetone, a vinyl monomer which is free of telogenic activity and which provides a side chain having at least two carbon atoms, the side chain being aromatic or having its elements bonded by a single bond only, and mixtures thereof;
   (b) applying a coating of said mixture on the surface of the substrate;
   (c) maintaining the coated substrate at a temperature above the melting point of the coating for a time sufficient to flow-out the coating to form a smooth coated surface, there being no radiation applied to the coated substrate; and
   (d) cooling the coated substrate to room temperature.

2. The method of claim 1 wherein the copolymer is comprised of about 40 to 60 wt. % of ethylene and about 60 to 40 wt. % of chlorotrifluoroethylene.

3. The method of claim 1 wherein the polyfunctional monomer is selected from the group consisting of triallylisocyanurate, triallylcyanurate, triallylpyromellitate, and triallylfumarate.

4. The method of claim 2 wherein the polyfunctional monomer is triallylisocyanurate or triallylcyanurate.

5. The method of claim 1 wherein up to about 10 wt. %, based on the total weight of the coating, of a heat stabilizer is incorporated into the coating mixture.

6. The method of claim 5 wherein the heat stabilizer is a di- or trivalent oxide or a complex thereof wherein the standard free energy change in going from the oxide to the corresponding metal chloride is equal to or less than about 11 Kcal/mol for the divalent metals, and equal to or less than about 16 Kcal/mol for the trivalent metals.

7. The method of claim 6 wherein the oxide compound is selected from the group consisting of lead oxide, calcium oxide, magnesium oxide, barium oxide, manganese oxide, cadmium oxide, strontium oxide, tin oxide and tribasic lead sulfate.

8. The method of claim 7 wherein the polyfunctional monomer is triallylisocyanurate or triallylcyanurate.

9. The method of claim 1 wherein the substrate, prior to the application of the coating mixture, is preheated to a temperature of about 250° to 360° C.

10. The method of claim 8 wherein the substrate, prior to the application of the coating mixture, is preheated to a temperature of about 250° to 360° C.

11. The method of claim 1 wherein the coating mixture is applied to the substrate in powder form.

12. The method of claim 1 wherein the coating mixture is applied to the substrate as an emulsion in a water matrix.

13. The method of claim 1 wherein the substrate is a metal selected from the group consisting of iron, steel, stainless steel, aluminum, zinc and copper.

14. The method of claim 1 wherein the copolymer is comprised of about 40 to 60 wt. % of ethylene and about 60 to 40 wt. % of tetrafluoroethylene.

15. The method of claim 2 wherein the polyfunctional monomer is triallylisocyanurate.

16. The method of claim 14 wherein the polyfunctional monomer is triallylisocyanurate.

17. The method of claim 2 wherein the polyfunctional monomer is triallylcyanurate.

18. The method of claim 14 wherein the polyfunctional monomer is triallylcyanurate.

19. The method of claim 5 wherein the copolymer is comprised of about 40 to 60 wt. % ethylene and about 60 to 40 wt. % of chlorotrifluoroethylene and the polyfunctional monomer is triallylisocyanurate or triallylcyanurate.

20. The method of claim 19 wherein the heat stabilizer is selected from the group consisting of lead oxide, calcium oxide, magnesium oxide, barium oxide, manganese oxide, cadmium oxide, strontium oxide, tin oxide and tribasic lead sulfate.

21. The method of claim 19 wherein the heat stabilizer is tribasic lead sulfate.

22. The method of claim 1 wherein the copolymer is an approximately equimolar copolymer of ethylene and chlorotrifluoroethylene.

23. The method of claim 1 wherein the polymer comprises from about 0.5 to 5 mol percent of 3,3,3-trifluoro-2-trifluoromethyl propene.

24. The method of claim 1 wherein the coated substrate is maintained at a temperature of about 250° to 360° C. for about 5 to 60 minutes.

25. The method of claim 1 wherein the coated substrate is maintained at a temperature of about 255° to 300° C. for about 5 to 60 minutes.

26. The method of claim 1 wherein the coated substrate is maintained at a temperature of about 255° to 300° C. for about 10 to 40 minutes.

* * * * *